(12) United States Patent
Scott

(10) Patent No.: US 7,760,374 B2
(45) Date of Patent: Jul. 20, 2010

(54) IDENTIFICATION DOCUMENT VERIFICATION SYSTEM

(75) Inventor: Stephen Scott, Melbourne (AU)

(73) Assignee: 0055 Management Services Pty Ltd, Melbourne, VIC (AU)

( * ) Notice: Subject to any disclaimer, the term of this patent is extended or adjusted under 35 U.S.C. 154(b) by 1419 days.

(21) Appl. No.: 10/927,507

(22) Filed: Aug. 27, 2004

(65) Prior Publication Data

US 2005/0111031 A1    May 26, 2005

(30) Foreign Application Priority Data

Aug. 29, 2003   (AU)  ............... 2003904689

(51) Int. Cl.
G06K 15/00 (2006.01)
H04N 1/00 (2006.01)
H04N 1/40 (2006.01)
G06Q 20/00 (2006.01)

(52) U.S. Cl. ............ 358/1.14; 358/405; 358/440; 358/1.15; 705/18

(58) Field of Classification Search ............ 358/1.15, 358/1.14, 400, 405, 434, 435, 436, 437, 438, 358/440; 709/220; 705/5, 18; 707/6, 201
See application file for complete search history.

(56) References Cited

U.S. PATENT DOCUMENTS

| | | | |
|---|---|---|---|
| 6,401,103 B1 * | 6/2002 | Ho et al. ............... | 707/201 |
| 6,529,881 B2 * | 3/2003 | Morganstein et al. ...... | 705/18 |
| 7,072,062 B2 * | 7/2006 | Eguchi ................ | 358/1.15 |
| 7,386,546 B1 * | 6/2008 | Santry et al. ............ | 707/6 |
| 2001/0043232 A1 * | 11/2001 | Abbott et al. ............ | 345/700 |
| 2002/0054365 A1 * | 5/2002 | Eguchi ................ | 358/405 |
| 2002/0156660 A1 * | 10/2002 | Nishimura et al. ......... | 705/5 |
| 2003/0130892 A1 * | 7/2003 | Taono et al. ............ | 705/14 |
| 2003/0145238 A1 * | 7/2003 | Yokoyama ............. | 713/202 |
| 2003/0158863 A1 * | 8/2003 | Haskin et al. ............ | 707/200 |
| 2003/0225767 A1 * | 12/2003 | Archibald et al. ......... | 707/10 |
| 2005/0138148 A1 * | 6/2005 | Ronen et al. ............ | 709/220 |
| 2005/0145798 A1 * | 7/2005 | Stark et al. ............ | 250/363.08 |

* cited by examiner

Primary Examiner—Jerome Grant, II
(74) Attorney, Agent, or Firm—Banner & Witcoff, Ltd.

(57) ABSTRACT

A method for enabling a user to effect an action with respect to records pertaining to an identification document or document that has an identification function is provided. The method may include associating a telephone number with the document, the user establishing a communications link which identifies the telephone number, verifying that the telephone number with which the communications link is established corresponds with the telephone number associated with the document, and enabling the user to effect an action with respect to the records pertaining to the document only if the verification is successful.

42 Claims, 2 Drawing Sheets

IDENTIFICATION DOCUMENT VERIFICATION SYSTEM

CROSS REFERENCE TO RELATED APPLICATIONS

This application is based upon and claims the benefit of priority under 35 U.S.C. §119 from the prior Australian Patent Application No. 2003904689, filed Aug. 29, 2003, the entire contents of which are incorporated herein by reference.

FIELD OF THE INVENTION

The present invention relates generally to the verification of documents, and in particular to a system and method for providing enhanced security with respect to the issuance and use of identification documents such as passports or documents that are intended to be used for other purposes but have an identification function such as cards that are used to access accounts.

BACKGROUND OF THE INVENTION

The ability to correctly identify individuals, especially when entering or leaving a country across national borders, has assumed increased importance in recent years due to the increasing threat of terrorism. However, the primary means for identifying and tracking the movement of individuals across borders is the use of paper documents, such as passports. Although the increased computerization of customs procedures has improved the ability to track the movements of individuals, the system is still only as reliable as the documents presented by travelers at customs desks.

Theft and fraudulent use are major problems associated with important identification documents, such as passports. For example, a stolen passport can be modified by a skilled forger to include a photograph of a person other than the passport's original owner and/or a new passport number. The person shown in the photograph is then, for all practical purposes, able to travel using the passport under the assumed identity of the original owner and/or a new identity. This may enable a person known to the authorities in a particular country to leave or enter that country undetected.

Theft of identification documents or documents that have an identification function may occur as a result of a burglary of an owner's place of residence. In some instances, the owner may not be immediately aware that their passport or other important documentation has been stolen, providing the thief with ample opportunity to sell the stolen documents, and for them to be modified and/or used fraudulently.

Further exacerbating these problems is the fact that, in many cases, new identification documents and documents with an identification function are sent out to their owners in the mail. These documents may therefore be intercepted and used fraudulently before the rightful owner is even aware that they have been stolen.

Additionally, many important identity documents have relatively long periods of validity, for example ten years or more. One reason for this is that the overheads associated with reissuing or revalidating documents are presently relatively high, for both the document holder and the issuing authority. Accordingly, it is inefficient and inconvenient to require document holders to reapply for replacement documents at shorter time intervals. The disadvantage of such long periods of validity is that they present an extended window of opportunity for the trafficking in valid documents for fraudulent use. It is, for example, possible for documents belonging to a deceased person to remain valid for many years after their death, unless some action is taken to cancel the documents rather than simply allowing them to expire.

The same problem exists with respect to other documents such as cards that are used to access accounts and in particular, credit cards. Fraudulent use of credit cards is a significant problem. Some issuing authorities have taken steps in an attempt to reduce the incidence of interception and fraudulent use of a newly issued credit card. For example, some issuers require an activation process to be executed before the card will be effective. However, this process is usually limited to requiring the recipient of the card to call an operator and provide some detail of the user such as their birth date. Unfortunately, the detail required is usually information that is relatively easy to obtain thus allowing theft of a newly issued card from a mailbox and activation of the card by a fraudulent user.

Accordingly, there is a need for a more secure means and method of verifying the correct delivery and possession of important documents, and in particular for limiting the circumstances in which identification documents and documents with an identification function may be fraudulently used.

It is also desirable to provide a means and method by which the legitimate holder of a document may conveniently and securely effect certain actions with respect to the document, such as renewal, cancellation and revalidation, thereby providing the document holder with greater individual control over the maintenance of the document.

Additionally, it is desirable to provide an efficient means and method whereby document holders are required to communicate with the issuing authority on a more frequent basis than is presently the usual practice, in order to increase the confidence of the authority that issued documents remain under the control of their legitimate owners.

Any discussion of documents, devices, acts or knowledge in this specification is included to explain the context of the invention. It should not be taken as an admission that any of the material formed part of the prior art base or the common general knowledge in the relevant art on or before the priority date of the claims herein.

SUMMARY OF THE INVENTION

The Method of the Invention

In one aspect, the present invention provides a method for enabling a user to effect an action with respect to records pertaining to an identification document or document that has an identification function, including the steps of:
associating a telephone number with the document;
the user establishing a communications link which identifies the telephone number;
verifying that the telephone number with which the communications link is established corresponds with the telephone number associated with the document; and
enabling the user to effect an action with respect the records pertaining to the document only if the verification is successful.

Accordingly, the user is only able to effect an action with respect to the records of a document by calling from the telephone number associated with the document, thus providing a relatively high level of confidence that the user is the person that was the intended recipient/user of the document.

In one illustrative embodiment, a personal identification number (PIN) is associated with the document and in addition to the step of identifying the telephone number, a PIN is obtained from the user over the communications link. In this particular embodiment, in addition to verifying that the telephone number corresponds with that number previously associated with the document, the PIN obtained from the user is also verified as corresponding with the PIN previously associated with the document. The PIN provides an additional level of security such that a user is only able to effect an action with respect to the records of a document by calling from the telephone number associated with the document and providing the PIN previously associated with the document.

In one embodiment, the document is a passport and the communications link is established by use of the telephony network. Alternatively, the document may be any other type of document that is intended to identify the user, such as a driver's license, a pilot's license or any identification document for security purposes or, a document that has other purposes but is only intended to be used by a legitimate owner such as credit cards or cards for accessing cash. In another embodiment, the number of the document assigned by the issuing authority is also required from the user before they are able to effect any action with respect to records pertaining to the document.

Advantageously, the records pertaining to the document may be accessed by an authorized person or organization in order to determine the status of the document as part of a procedure used to assess whether the document is being used fraudulently.

For example, customs officials would be able to verify that an issued passport has been correctly validated by an authorized user in accordance with the method of the invention.

Identifying the Calling Number

The step of identifying the telephone number may include obtaining the telephone number using a calling line identification service. Alternatively, the telephone number may be obtained using a calling number display service.

As a further alternative, the user may provide the telephone number to the verification server via the communications link, and the verification server confirms that the user is actually calling from the number provided by disconnecting and calling the user back, referred to as a "call back" service. In a preferred method, prior to disconnecting, the user is provided with a temporary code and upon calling the user, the temporary code is requested. Provision of the temporary code provides a higher level of confidence that the user providing the code is the user who previously placed the call from the telephone number provided to the verification server.

Advantageously, public switched telephony networks provide a relatively high level of security, making it extremely difficult for an unauthorized user to falsify a calling number identification in order to circumvent the security of a method of the invention.

Nominating a Telephone Number

The step of associating a telephone number with the document can include the user providing the telephone number as part of the process of applying to an issuing authority to obtain the document. Alternatively, an issuing authority may associate a telephone number with the document based upon other personal details of the user provided at the time of application for the document, for example the issuing authority may obtain a telephone number based upon the user's name and address. The user may subsequently be allowed to change the telephone number associated with the document.

It is preferred that the telephone number associated with the document is a number corresponding to a fixed terrestrial telephone line. Advantageously, this enables the owner of the line to be easily identified, improving the security of the method by making it difficult for unauthorized users to conceal or falsify their identities.

In another aspect, in order to ensure a relatively high level of security, that the telephone number associated with the document is the user's own home telephone number. However, the telephone number may alternatively be the user's mobile telephone number, business telephone number, the telephone number of a trusted friend or relative, or any other telephone number nominated by the user and acceptable to the issuing authority.

Nominating a Personal Identification Number (PIN)

The step of associating a PIN with the document may include the user providing their chosen personal identification number as part of the process of applying to obtain the document. This provides the advantage that it is then extremely difficult for an unauthorized user to obtain the personal identification number in order to circumvent the security of the method. Alternatively, the issuing authority may choose a personal identification number, for example at random, and transmit it to the user independently of the document. The user may subsequently be allowed to change the personal identification number associated with the document.

In one aspect, the PIN can include four digits. However, it will be appreciated by those skilled in the art that different numbers of digits may be used for the personal identification number, and that the personal identification number should not be limited to contain only numeric characters.

Verification Server/IVR Gateway

In illustrative embodiments, the method also includes the step of providing a verification server connected to a telephony network. The step of establishing a communications link may include the user dialing a telephone number that connects the user's telephone to the verification server.

The verification server can include an interactive voice response gateway. The verification server may include a database. In one illustrative embodiment, the database contains records including data such as the telephone numbers associated with documents and is a database maintained by the issuing authority.

In the event that verification of any details is not successful, the method may include a range of options depending upon the type of error during the verification process. For example, when a PIN is incorrect, the user may be informed and advised to re-enter the PIN. However, in the instance that a more serious verification failure occurs, further details of the document may be requested such as the document number as issued by the issuing authority and the details of the attempt to effect actions with respect to the document may be passed to a relevant law enforcement agency.

In any event, once a verification failure occurs, an entry in a database, referred to as a "seize" database, occurs and further actions with respect to entries in the "seize" database may be decided by a relevant authority.

PIN Entry

In illustrative embodiments, the step of obtaining a PIN from the user may include the verification server prompting the user to enter the number. The prompt may be a voice prompt. The verification server may obtain a PIN by the user entering the digits of the number using the touch-tone keys of the telephone. Alternatively, a voice recognition system may be employed in the verification server to enable the user to speak the digits of the personal identification number.

Choice of Action

The action that the user is able to effect may include one or more of the following: validating the document; canceling the document; and reinstating the document. A particular advantage of the invention according to some aspects is that the document may be initially invalid for use, however upon receipt by the intended recipient the document may be validated through the use of the method provided by the invention. This prevents unauthorized use by any party intercepting the document prior to its receipt by the rightful owner.

The verification server may provide the user with a menu of numbered options to access the available actions. The menu may be a voice menu. The user may effect the desired action by entering the corresponding number via the touch-tone keys of the telephone. Alternatively, voice recognition may be employed in the verification server to enable the user to select the desired action by speaking the corresponding number.

In some embodiments, the user may be required to provide a further identifying number associated with the document prior to the action being effected.

Interface with Issuing Authority

In some illustrative forms, the step of verifying that the user's telephone number and the PIN obtained correspond with the telephone number and PIN associated with the document includes sending the telephone number and the obtained PIN to the issuing authority of the document for verification. The issuing authority may respond with an indication of whether the telephone number and PIN are valid or invalid.

The step of enabling the user to effect an action can include sending a request to effect the action to the issuing authority. The issuing authority may respond with an indication of whether the attempt to effect the action has been successful or unsuccessful.

In some aspects, communication with the issuing authority is entirely electronic such as, for example, via a database interface over a communications network. Advantageously, this arrangement ensures that it is not necessary for the user or the provider of the document verification service to have access to any of the detailed, and potentially confidential and sensitive, data held by the issuing authority in order to perform a verification step.

The System of the Invention

In another aspect, the present invention provides a system for enabling a user to effect an action with respect to records pertaining to an identification document, or document that has an identification function including:
  a network, within which the user is able to establish a communications link;
  identifying means for identification of the telephone number with which a communications link is established;
  verifying means for verification that said telephone number corresponds with a telephone number previously associated with the document; and
  means for enabling the user to effect an action with respect to records pertaining to the document only upon successful verification that the telephone number verified by the verification means corresponds with the telephone number identified as the number with which a communications link was established.

In some illustrative embodiments, the means for identifying the telephone number includes a calling line identification service, a calling number display service or a call back service.

In an embodiment where a PIN is also associated with the document, the system may include a means for obtaining a PIN from the user via the communications link and means for verifying that the PIN obtained from the user corresponds with the PIN previously associated with the document. In this embodiment, the user is only allowed to effect an action in relation to the records pertaining to the document if verification of both the telephone numbers and PIN numbers is successful.

In some illustrative embodiments, the system further includes a verification server connected to a communications network in the form of a telephony network, such that the communications link established by the user connects the telephone to the verification server. The user may establish the communications link by dialing a telephone number corresponding to the verification server.

The verification server includes an interactive voice response gateway. The verification server may further include a computer system programmable to carry out one or more of the functions of the system. The verification server may include a database. In one illustrative embodiment, the database contains records including telephone numbers associated with documents for the purpose of verifying the originating telephone numbers of incoming connections and is maintained by the issuing authority.

The means for obtaining a PIN may include electronic hardware and/or computer program code capable of receiving touch-tone signals from a telephone via the telephony network so that the user is able to enter a PIN via the keypad of the telephone.

In one illustrative embodiment, the computer system in the verification server is able to create an electronic connection to an interface to a database maintained by the issuing authority of the document. The means for verifying that said telephone number corresponds with a telephone number associated with the document and the means for verifying that said PIN corresponds with a PIN associated with the document may include computer program code designed to open a connection to the issuing authority database, and to request verification that the telephone number and PIN correspond to numbers associated with a document. The computer program code may further be designed to receive a response from the issuing authority database indicating whether the telephone number and PIN are valid or invalid.

The means for enabling the user to effect an action may include computer program code designed to provide the user with a menu of numbered options to access the available actions. The menu may be a voice menu. The user may effect the desired action by entering the corresponding number via the touch-tone keys of the telephone. The computer program code may further be designed to open a connection to the issuing authority database, and to send a request to effect an action selected by the user. The computer program code may be further designed to receive a response from the issuing authority database indicating whether the attempt to effect the action has been successful or unsuccessful.

The Method of the Invention from the User's Perspective

In a further aspect, the present invention provides a method for a user to effect an action with respect to records pertaining to an identification document or document that has an identification function, including the steps of:
  establishing a communications link; and
  transmitting an instruction to effect an action with respect to records pertaining to the document over the communications link,
  wherein the establishment of a communications link identifies the telephone number from which the link is established at the receiving end of said communications link, and wherein the user is only permitted to effect an action with respect to records pertaining to the document if the telephone number corresponds with a telephone number previously associated with the document.

In an illustrative embodiment where a PIN is also associated with the document, a PIN is transmitted via the communications link and the instructions to effect an action is only permitted if the transmitted PIN corresponds to a PIN previously associated with the document.

The Method of the Invention from the Issuing Authority's Perspective

In still a further aspect, the present invention provides a method for enabling a user to effect an action with respect to records pertaining to an identification document, or document that has an identification function including the steps of:

receiving credentials of the user including the telephone number from which the user has established a communications link; and authorizing the user to effect an action with respect to the document only if the telephone number from which the communications link is established corresponds with a telephone number previously associated with the document.

A PIN can be obtained from the user via the communications link and authority for the user to effect an action is only provided if the PIN obtained from the user corresponds with a PIN previously associated with the document and the telephone numbers also correspond.

Further benefits and advantages of the method and system according to the present invention will become apparent in the following description of a preferred embodiment of the invention.

BRIEF DESCRIPTION OF THE DRAWINGS

An illustrative embodiment of the invention will now be described. The following description should not be considered to limit the scope of the invention or any of the preceding statements. The illustrative embodiment is described with reference to the accompanying drawings in which.

DETAILED DESCRIPTION

For convenience, the following example illustrative embodiment of the invention relates to the specific example of a passport application, however it will be appreciated by those skilled in the art that the invention is not limited to this particular use.

In accordance with the invention, an applicant applying for a passport includes in the application a nominated telephone number, most preferably a home telephone number, and a nominated PIN being, for example, a four digit number devised at the applicant's choice.

Figure 1:
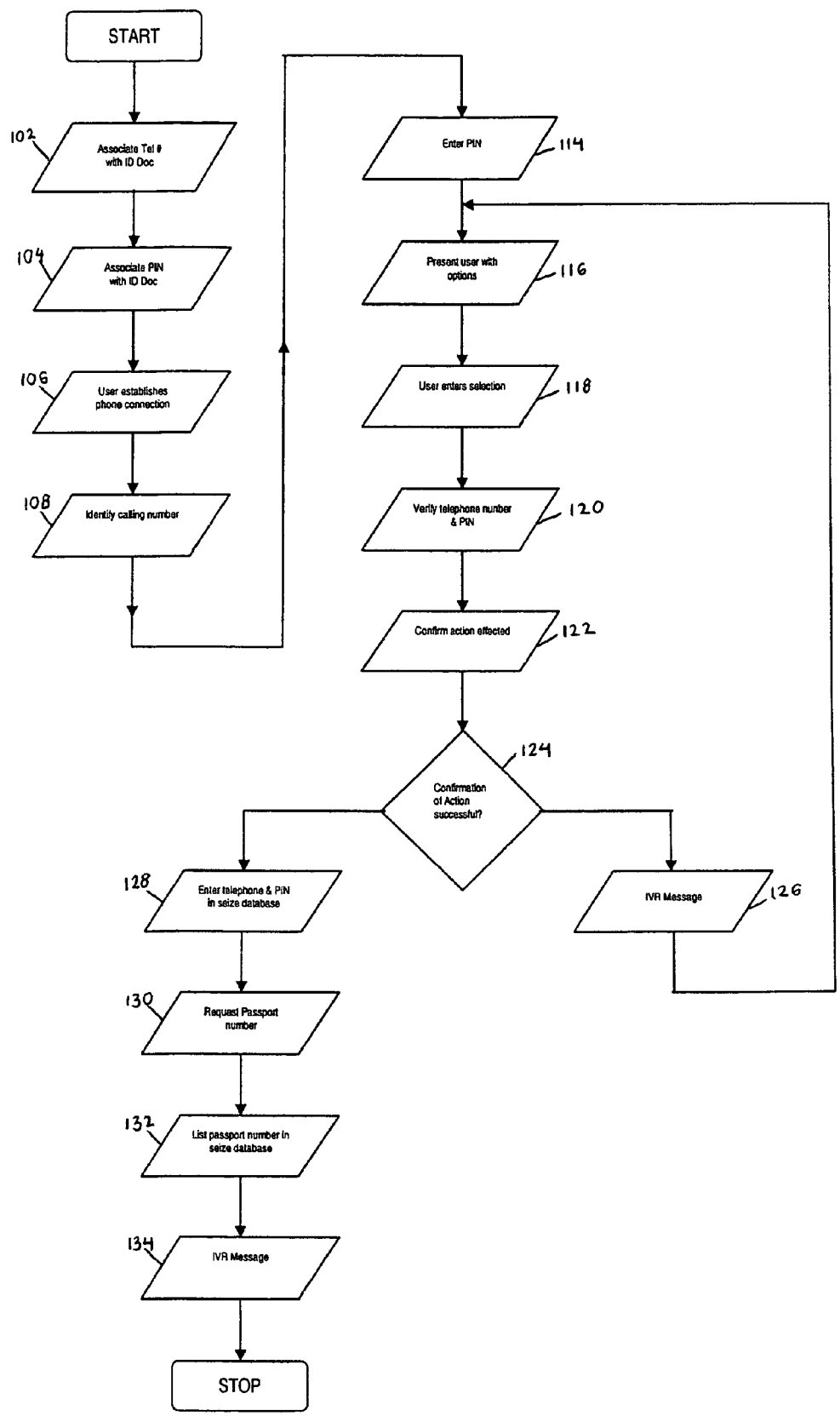
FIG. 1 is a flow chart illustrating a method according to the illustrative embodiment of the present invention.

By including these details in the application, the numbers become associated with the identity document, which is a passport in this example, in accordance with the steps 102, 104 of the flow chart 100 shown in FIG. 1.

When the application has been processed by the issuing authority, the passport is sent to the applicant, for example by postal mail. Upon receipt of the new document, the applicant uses the nominated telephone to establish a communications link, in accordance with the step 106. At the receiving end of the link, the calling number is identified 108, for example using a calling line identification (CLI), calling number display (CND) service or a call back service (CBS) as provided by the intervening telephony network.

The applicant is then prompted 114 to provide a PIN, as a further stage of verification. This provides at this point an identification number consisting of a total of, for example, 14 digits, being 10 digits of the telephone number (including area code) and a four digit personal identification number, offering a relatively high level of security.

Accordingly, in the next step 116 the user is provided with a list of options for actions that they are able to effect with respect to the records pertaining to the new passport. This list may include, for example, validate a new passport; cancel an existing passport; and reinstate an existing passport.

For security purposes, the new passport will have been sent out to the applicant without having been validated. The records pertaining to the passport will accordingly indicate that the passport is not validated and upon any attempt by any person to use the passport, the records will be checked by an authorized person such as a customs officer who may then seize the passport. Thus, until the passport has been validated by the applicant, it cannot be used by any authorized or unauthorized person thus preventing fraudulent use of the newly issued passport.

In the case of a new passport, the applicant will be required to initially validate same and will select this option at the step of entering a selection 118. Unauthorized persons who may intercept the passport will generally not have access to the nominated telephone and will also not know the associated PIN and therefore will be unable to validate the passport.

In the next step 120 the combination of the telephone number and PIN are submitted to the issuing authority database for verification to ensure that they are associated with an issued passport. At step 122, the user request is sent to the issuing authority to effect the selected action.

At step 124, confirmation or otherwise of successfully effecting the user's requested action may be provided by the issuing authority. If the action is successfully effected, the method proceeds to step 126 wherein an IVR message is provided to the user confirming that the action was successful. The method may then proceed back to step 116 wherein the user is once again presented with a menu of options. If the user does not require any further actions to be effected, they may simply terminate the call by hanging up the telephone.

However, if at step 124 the issuing authority provides an indication that the requested action was not successful, the method proceeds to step 128 wherein the telephone number and PIN previously supplied by the user is entered into the "seize" database. Subsequently, the method proceeds to step 130 wherein the passport number is requested from the user in order to identify the particular passport number for which a user may be attempting to fraudulently use. Once the passport number has been obtained from the user, the method proceeds to step 132 wherein the passport number is also listed in the "seize" database. The method then proceeds to step 134 wherein an IVR message may be provided to the user. In one illustrative embodiment of the invention, the IVR message provided at step 134 does not provide any indication to the user that the attempted fraudulent use has been detected although the entry of the passport number in the "seize" database will automatically be identified to a customs official when the user attempts to use the passport. This particular approach has the beneficial advantage that although an attempted fraudulent use of a passport has been identified the user is not alerted to the detection of their attempted fraudulent validation of the passport and hence will be unaware that customs officials or law enforcement officers will be monitoring the use of the passport for the purposes of detaining the fraudulent user.

Figure 2:
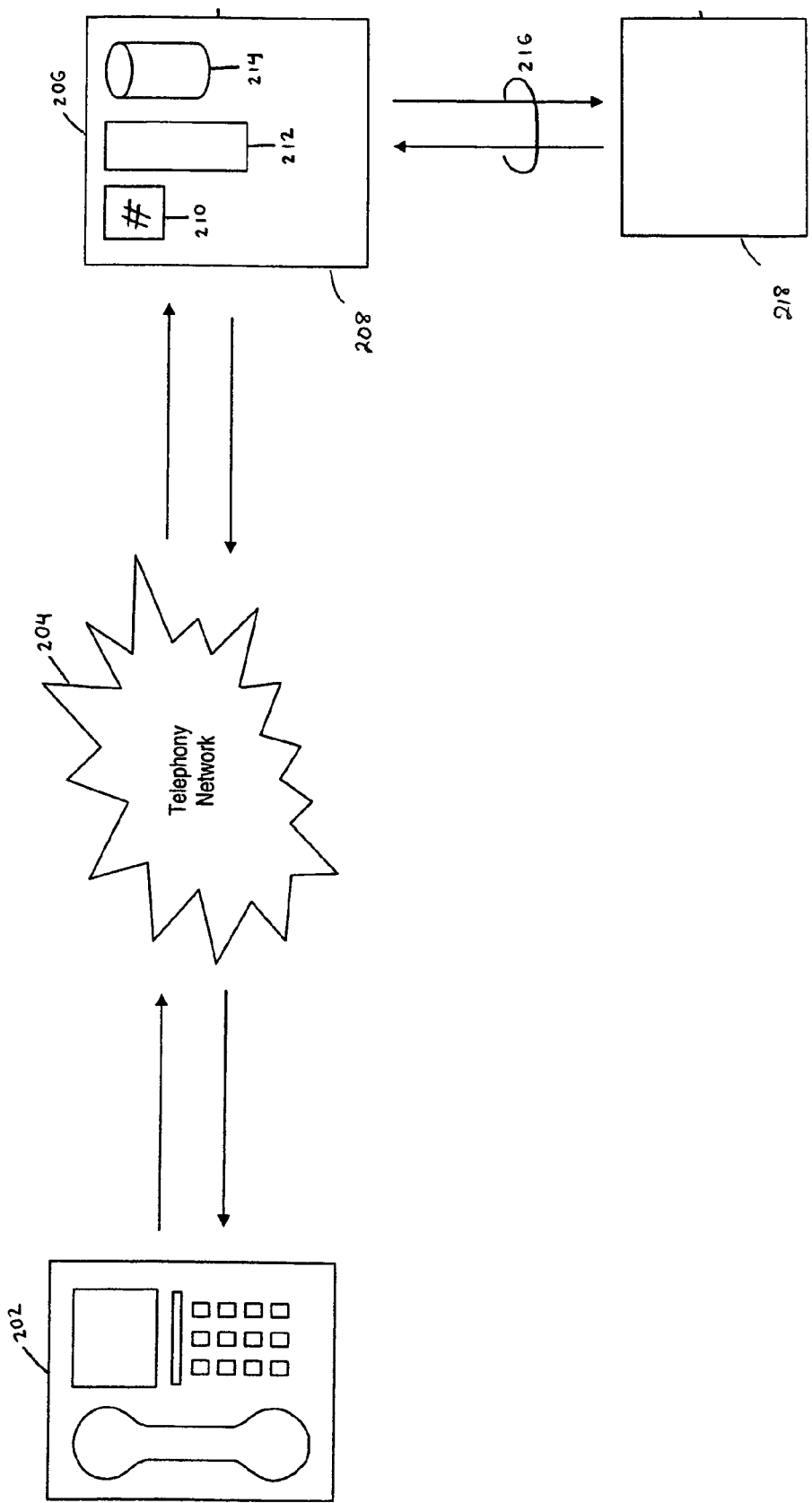
FIG. 2 is a block diagram of a secure document verification system according to the illustrative embodiment of the present invention.

A system for automating the method of the invention is illustrated in FIG. 2. The system includes the applicant user's telephone 202 connected to a communications network in the form of a telephony network 204. By dialing an appropriate telephone number, which may be provided, for example, along with the new passport when delivered by mail, the user is able to establish a telephone connection as a communications link to a receiving location 206. At the receiving location there is provided a verification server 208 including an interactive voice response gateway, which includes a switch 210 for routing incoming calls, programmable computing means 212 for terminating incoming calls and carrying out processing operations, and local data storage 214.

A connection 216 may be opened from the verification server to a database 218 operated by the passport issuing authority. Although shown as a connection distinct from the telephony network in FIG. 2, the connection 216 may also be via the telephony network if required. Alternatively the connection may be via a dedicated communications channel, or may be via another network such as the Internet.

The computing means is programmed to carry out the processing steps required to implement the method described previously with reference to FIG. 1.

A software program therefore provides means for identifying the telephone number of the telephone 202, for example using calling line identification or calling number display or a call back service, as required at step 108.

The software also provides means for verifying that the telephone number corresponds with the telephone number associated with the passport. At step 120, this may include checking the identified number against a database of all nominated telephone numbers held in the local storage 214.

The software further provides means for obtaining a personal identification number from the user via the communications link, for example by receiving touch-tone signals generated by the user pressing buttons of the key pad of the telephone 202. Alternatively, the PIN may be obtained by a live operator.

Also included in the software are means for verifying that the personal identification number provided by the user corresponds with the personal identification number associated with the passport. This may be implemented via the connection 216 to the database 218 of the issuing authority. A request may be sent to the database to verify the credentials including the personal identification number and the telephone number, to which the database responds with an indication of whether or not the combination is valid.

The software also includes means for enabling the user to effect an action with respect to the records pertaining to the passport via the menu of choices presented in accordance with step 116. The software may provide the user with a menu of numbered options to access the available actions, which may be a voice menu over the telephone link. The user selects the desired action by entering the corresponding number via the touch-tone keys of the telephone. The software then sends a request to effect the selected action via the connection to the issuing authority database, and receives a response indicating whether the attempt to effect the action has been successful or unsuccessful.

It will be appreciated by those skilled in the art that many further variations of the invention are possible, in addition to what is described in the foregoing preferred embodiment.

For example, the method and system of the invention may be used to cancel a document rather than to validate the document. In an embodiment, the cancellation action will be successful so long as the user is validated according to the telephone number and personal identification number, and the document is currently valid. This enables the user to prevent any unauthorized use of the document after it is lost or stolen. Furthermore, if the document is subsequently recovered, the system and method of the invention may be used to revalidate it.

Further, or alternatively, security measures may also be introduced. For example, verification of identification may include requiring the user to enter their date of birth, and/or to enter their first name using the keypad.

If a user is having difficulties with the automated system, or is receiving repeated unsuccessful responses from the issuing authority database, the system could recognize the problem and offer to switch the user to a live operator at the issuing authority office.

For users without fixed home telephone lines, the option of providing a mobile number may be provided. Users may alternatively or additionally be permitted to provide the telephone numbers of trusted friends or relatives if they do not have other access to a suitable telephone line. An option to enter the nominated telephone number via a telephone keypad, rather than obtaining it from calling line identification, may be provided to enable the service to be used, for example, from overseas in an emergency.

In the particular instance of a user being overseas and losing all of their identification documents, the unique identification number accorded to users of the system may be used by overseas Consulates as a means of identifying individuals. In this respect, it would usually be very difficult to require individuals to remember a long identification number comprising 18 or more digits. However, where those numbers accord with the users telephone number, birth date and a four digit PIN, the difficulty in memorizing such a number is restricted to the PIN as the other numbers are usually easy for most people to recall. By using this unique number accorded to a user by the system of the present invention, overseas Consulates would also have an improved level of confidence with respect to the identify of an individual who claimed to have lost all documents that could serve to identify them.

As a further enhancement of security procedures for important documents, the system and method of the present invention may be used to implement an efficient and cost effective periodic revalidation program. For example, document holders may be required to use the system to revalidate their documents at regular intervals, e.g. annually, otherwise the document is automatically invalidated. This would ensure that in cases where a document holder was not aware that the document was missing or stolen, or where the document holder has died, the period of validity during which the document may be used fraudulently is limited. It would also ensure that document holders are compelled to maintain regular contact with the issuing authority. In one illustrative embodiment, a system according to the present invention places calls to owners of documents to initiate re-validation of the document and warn the user that cancellation of the document is pending unless re-validation is effected.

Furthermore, the requirement for periodic revalidation may be accompanied by a fee, and in this case the system and method of the present invention may be further enhanced to provide for automatic charging of the fee to a bank account or credit card account of the applicant, or the fee could be automatically charged to the applicant's telephone account.

In another embodiment, the method and system of the present invention is used to improve the security associated with the issuance of documents that are used for other purposes but have an identification function. For example, new credit cards are generally sent to users through the postal system and if intercepted, the card may be fraudulently used. This is particularly the case where the card has a portion for a user's signature which is blank at the point of issuance. Of course, if intercepted, a fraudulent user can simply sign the blank portion with the user's name and commence using the card to access the legitimate owner's credit account.

Attempts have been made to reduce the possibility of fraudulent interception and use of documents such as credit cards by requiring users to activate the card by calling an operator and providing some personal detail. However, the call to the operator may be placed from any telephone and the detail required about the legitimate user is usually relatively easy to obtain from publicly available records (e.g. birth date).

As will be recognized from the foregoing description, when the method and system of the present invention is used in relation to the issuance of documents such as credit cards or cash access cards, there is a significant improvement with respect to the level of confidence on the part of the issuing authority that the card has been activated by the intended recipient.

The claims defining the invention are as follows:

1. A method for enabling a user to effect an action with respect to records pertaining to an identification document or document that has an identification function, including the steps of:
   associating a telephone number with the document;
   the user establishing a communications link which identifies the telephone number;
   verifying that the telephone number with which the communications link is established corresponds with the telephone number associated with the document; and
   enabling the user to effect an action with respect to the records pertaining to the document only if the verification is successful.

2. The method according to claim 1 including the additional steps of associating a personal identification number with the document and subsequent to verifying that the telephone number with which the communications link is established corresponds with the telephone number associated with the document, receiving a personal identification number from the user and only enabling the user to effect an action with respect to the records pertaining to the document if the verification is successful and the personal identification number received from the user corresponds with the personal identification number associated with the document.

3. The method according to claim 1 wherein the document has its own identification means and is selected from the group including:
   Passport;
   Credit Card;
   Cash Access Card;
   EFIPOS Card;
   Transaction Card;
   Pilots License;
   Driver's License;
   Health Care Card;
   Boat License; or
   Area access Card.

4. The method according to claim 1 including the additional steps of associating a document number with the document and subsequent to verifying that the telephone number with which the communications link is established corresponds with the telephone number associated with the document, receiving a document number from the user and only enabling the user to effect an action with respect to the records pertaining to the document if the verification is successful and the document number received from the user corresponds to the document number associated with the document.

5. The method according to claim 1 further including verifying the telephone number with which the communications link is established using a calling line identification service.

6. The method according to claim 1, further including verifying that the telephone number with which the communications link is established corresponds with the telephone number associated with the document using a calling number display service.

7. The method according to claim 1, further including verifying that the telephone number with which the communications link is established corresponds with the telephone number associated with the document by disconnecting the initial call by the user and placing a call to the user wherein the call to the user is based upon information obtained from a calling line identification or calling number display service.

8. The method according to claim 7 further including, prior to disconnecting the initial call from a user, providing the user with a temporary code and upon placing a call to the user, requesting the temporary code, and verifying that the user has provided the correct temporary code.

9. The method according to claim 1 including the step of the issuing authority of a document obtaining the telephone number of a user at the time the user applies for a document.

10. The method according to claim 1 including the step of the issuing authority of a document obtaining personal details of the user at the time the user applies to the issuing authority for the document and from the personal details the issuing authority establishing a telephone number for the user.

11. The method according to claim 1 wherein the telephone number associated with the document corresponds to a user's home telephone number.

12. The method according to claim 1 wherein the telephone number associated with a document is a user's mobile telephone number.

13. The method according to claim 1 wherein the telephone number associated with a document is a user's business telephone number.

14. The method according to claim 1 wherein the telephone number associated with the document is a telephone number corresponding to a trusted friend or relative of a user.

15. The method according to claim 1 including the step of the issuing authority of a document obtaining a personal identification number from a user at the time the user applies to the issuing authority for a document.

16. The method according to claim 1 including the step of the issuing authority of a document selecting a personal identification number for a user and communicating the personal identification number to the user independently of the transmission of the document.

17. The method according to claim 2 including the receiving a user request to change the personal identification number associated with the document of the user.

18. The method according to claim 1 wherein a verification server is connected to a telephony network and the step of establishing a communications link includes establishing the communications link in response to the user dialing a telephone number that connects the user's telephone to the verification server.

19. The method according to claim 1 including the step of recording details relating to an attempt to effect an action with respect to records pertaining to an identification document or document that has an identification function in the event that verification is unsuccessful.

20. The method according to claim 19 including the step of the issuing authority receiving a report of a failed verification thus enabling the issuing authority to take appropriate action with respect to the relevant document for which an action was attempted to be effected.

21. The method according to claim 1 wherein the action that is effected with respect to records pertaining to an identification document or document that has an identification function includes at least one of
  validating the document;
  canceling the document; or
  reinstating the document.

22. The method according to claim 1 including the step of transmitting a document to an intended recipient with the document initially invalid for use.

23. The method according to claim 1 wherein an entity independent of the issuing authority of a document receives calls from a user seeking to effect an action with respect to the records pertaining to a document the method including the additional step of the entity transmitting the telephone number and/or any other information to the issuing authority and receiving an indication as to whether the verification has been successful.

24. The method according to claim 23 including the additional step of the entity receiving a request to effect an action from a user, transmitting the request to the issuing authority and receiving a response from the issuing authority indicating whether or not the attempt to effect the action has been successful.

25. A system for enabling a user to effect an action with respect to records pertaining to an identification document or document that has an identification function, including:
  a network, within which the user is able to establish a communications link;
  a computer system including a processor and memory for storing computer-executable instructions, which when executed by the processor perform the steps of
    identifying the telephone number with which a communications link is established;
    verifying that the telephone number corresponds with a telephone number associated with the document; and
    enabling the user to effect an action with respect to records pertaining to the document only upon successful verification that the telephone number corresponds with the telephone number identified as the number with which a communications link was established.

26. The system according to claim 25 wherein the step of identifying the telephone number includes interfacing with at least one of the following:
  a calling line identification service;
  calling number display service; or
  a call back service.

27. The system according to claim 25, wherein the computer executable instructions further perform, when executed by the processor, the step of receiving a personal identification number from a user over the communications link and verifying that the personal identification number obtained from the user corresponds with a personal identification number previously associated with the document.

28. The system according to claim 25 including a verification server connected to the communications network such that the communications link established by the user connects the user's telephone to the verification server.

29. The system according to claim 28 wherein the verification server includes an interactive voice response gateway configured to prompt users for relevant information and receive the relevant information in response to the prompts.

30. The system according to claim 28 wherein the verification server includes a database containing records including telephone numbers associated with documents for the purpose of verifying the originating telephone numbers of incoming connections.

31. The system according to claim 28 wherein the verification server is operable to create an electronic connection with a database maintained by an issuing authority of a document.

32. The system according to claim 31 wherein the step of identifying that the telephone number corresponds with the telephone number associated with the document and the step of verifying that the personal identification number corresponds with a personal identification number associated with the document includes opening a connection to the issuing authority database to request verification that the telephone number identified from the user's establishment of a communications link and the personal identification number received from the user over the communications link correspond with the numbers associated with the document according to the issuing authority's database.

33. The system according to claim 32 wherein the step of verifying further includes receiving a response from an issuing authority's database indicating whether the telephone number and personal identification number received from a user are valid or invalid.

34. The system according to claim 25 wherein the step of enabling the user to effect an action includes providing a user with a menu of numbered options to access available actions.

35. The system according to claim 34 wherein the menu is presented to a user by a synthesized voice, and wherein the step of enabling further includes enabling the user to effect the desired action by entering a number corresponding to the desired action by selection of the appropriate touch-tone key of a telephone handset.

36. The system according to claim 35 wherein the step of enabling further includes
  establishing a connection with an issuing authority's database,
  transmitting a request to effect an action selected by a user to the database, and
  receiving a response from the issuing authority database indicating whether the attempt to effect the action has been successful.

37. A method for enabling a user to effect an action with respect to records pertaining to an identification document or document that has identification function, including the steps of:
  establishing a communications link; and
  transmitting an instruction to effect an action with respect to records pertaining to the document over the communications link;
  wherein the establishment of the communications link identifies the telephone number from which the link is established at the receiving end of said communications link, and wherein the user is only permitted to effect an action with respect to records pertaining to the document if the telephone number corresponds with a telephone number previously associated with the document.

38. The method according to claim 37 wherein a personal identification number is also associated with a document, the method further including the additional step of obtaining a personal identification number from a user and transmitting the personal identification number over the communications link and only allowing the instructions to effect an action to occur if the transmitted personal identification number corresponds to the personal identification number previously associated with the document.

39. A method for enabling a user to effect an action with respect to records pertaining to an identification document or document that has an identification function, including the steps of:

the user establishing a communications link;

receiving credentials from the user and identifying a telephone number from which the user established the communications link; and authorizing the user to effect an action with respect to the document only if the telephone number from which the communications link is established corresponds with a telephone number previously associated with the document.

40. The method according to claim 39 including the additional step of associating a personal identification number with a document and obtaining from the user over the communications link a personal identification number and only effecting an action requested by a user when the personal identification number obtained from the user corresponds with the personal identification number previously associated with the document.

41. A method for enabling a user to effect an action with respect to records pertaining to an identification document, or a document that has an identification function, the method comprising:

the user establishing a communications link wherein during the step of establishing the link, receiving the calling number from the user and providing the user with a temporary code;

disconnecting the communications link and subsequent re-establishment of the communications link with the user by placing a call to the number received from the user and requesting the previously provided temporary code;

confirming successful establishment of a communications link in the event that the temporary codes provided and subsequently received match;

verifying that the telephone number from which the user established the initial communications link corresponds with the telephone number associated with a document; and enabling the user to effect an action with respect to the records pertaining to the document only if the verifying is successful.

42. The method according to claim 41 further including associating a personal identification number with a document and obtaining from the user over the communications link a personal identification number and only effecting an action requested by a user when the personal identification number obtained from the user corresponds with the personal identification number previously associated with the document.

* * * * *

UNITED STATES PATENT AND TRADEMARK OFFICE
CERTIFICATE OF CORRECTION

PATENT NO. : 7,760,374 B2
APPLICATION NO. : 10/927507
DATED : July 20, 2010
INVENTOR(S) : Stephen Scott It is certified that error appears in the above-identified patent and that said Letters Patent is hereby corrected as shown below:

In Column 11, Claim 3, Line 55:
Please delete "EFIPOS" and insert -- EFTPOS --.

Signed and Sealed this
Twenty-sixth Day of April, 2011

David J. Kappos
*Director of the United States Patent and Trademark Office*